(12) United States Patent  
Cha et al.

(10) Patent No.: US 9,086,846 B2  
(45) Date of Patent: Jul. 21, 2015

(54) MOBILE TERMINAL (71) Applicants: Ilgu Cha, Seoul (KR); Wonseok Joo, Seoul (KR); Donghan Shin, Busan (KR); Youngsoo Son, Seoul (KR)

(72) Inventors: Ilgu Cha, Seoul (KR); Wonseok Joo, Seoul (KR); Donghan Shin, Busan (KR); Youngsoo Son, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 363 days.

(21) Appl. No.: 13/624,803

(22) Filed: Sep. 21, 2012

(65) Prior Publication Data

US 2013/0076709 A1 Mar. 28, 2013

(30) Foreign Application Priority Data

Sep. 22, 2011 (KR) .................. 10-2011-0095957

(51) Int. Cl.
*G06F 3/038* (2013.01)
*G06F 1/16* (2006.01)

(52) U.S. Cl.
CPC ............ *G06F 1/1632* (2013.01); *G06F 1/1654* (2013.01)

(58) Field of Classification Search
CPC ............................. G06F 1/1632; G06F 1/1654
See application file for complete search history.

(56) References Cited

U.S. PATENT DOCUMENTS

| 7,813,776 | B2 * | 10/2010 | Lee et al. ................. 455/575.4 |
| 2006/0111161 | A1 * | 5/2006 | Cha et al. ................. 455/575.4 |
| 2006/0209505 | A1 * | 9/2006 | Kim ............................ 361/683 |
| 2007/0153452 | A1 * | 7/2007 | Harmon et al. ............ 361/679 |
| 2008/0253070 | A1 * | 10/2008 | Rissanen et al. ........... 361/681 |
| 2009/0286573 | A1 | 11/2009 | Jang et al. |
| 2010/0246110 | A1 * | 9/2010 | Kubo et al. ............ 361/679.01 |
| 2010/0246120 | A1 * | 9/2010 | Yada et al. ............. 361/679.56 |

FOREIGN PATENT DOCUMENTS

| CN | 1811661 | 8/2006 |
| CN | 1984158 | 6/2007 |
| CN | 201234304 | 5/2009 |
| CN | 102196072 | 9/2011 |

OTHER PUBLICATIONS

The State Intellectual Property Office of the People's Republic of China Application Serial No. 201210356245.9, Office Action dated Dec. 17, 2013, 7 pages.

* cited by examiner

*Primary Examiner* — Kashif Siddiqui
(74) *Attorney, Agent, or Firm* — Lee, Hong, Degerman, Kang & Waimey (57) ABSTRACT

The present disclosure may provide a mobile terminal including a first body having a display unit, and a second body provided with a circuit board for driving the display unit thereinside and combined with a rear surface of the first body, wherein the rear surface of the first body is divided into a first region formed along an edge of the first body and a second region defined by the first region, and the second body is disposed at the second region to be hidden by a front surface of the first body.

20 Claims, 8 Drawing Sheets

MOBILE TERMINAL

CROSS-REFERENCE TO RELATED APPLICATION

Pursuant to 35 U.S.C. §119(a), this application claims the benefit of earlier filing date and right of priority to Korean Application No. 10-2011-0095957, filed on Sep. 22, 2011, the contents of which are incorporated by reference herein in its entirety.

BACKGROUND OF THE INVENTION

1. Field of the Invention

The present invention relates to a mobile terminal having a display unit for displaying visual information.

2. Background of the Invention

A mobile terminal is an electronic device that can be hand-carried, as well as having at least one of a voice and video communication function, an information input and/or output function, a data storage function, and the like.

As the functions becomes diversified, the terminal is implemented in the form of a multimedia player having complicated functions such as capturing still or moving images, playing music or video files, gaming, receiving broadcast signals, and the like.

In order to implement such complicated functions in a multimedia player, various new attempts have been applied in the aspect of the hardware or software. As an example, a user interface environment is provided to allow the user to easily and conveniently retrieve or select the functions.

Recent mobile terminals have been mainly developed as a bar type the most front surface of which is configured with a screen. Such a bar type has difficulty in design differentiation, and thus a new form factor for implementing a large-sized screen as well as implementing a differentiated design may be taken into consideration.

SUMMARY OF THE INVENTION

The present disclosure is to provided a mobile terminal with a new form factor.

Furthermore, the present disclosure provides a mechanism in which a large-sized screen can be easily and stably used in a mobile terminal.

In order to solve the foregoing task, a mobile terminal according to an embodiment of the present disclosure may include a first body having a display unit, and a second body provided with a circuit board for driving the display unit thereinside, and combined with a rear surface of the first body, wherein the rear surface of the first body is divided into a first region formed along an edge of the first body and a second region defined by the first region, and the second body is disposed at the second region to be hidden by a front surface of the first body.

As an example associated with the present disclosure, the second body may be formed with a smaller size than that of the first body such that a lateral surface of the second body and a lateral surface of the first body are formed in a stepwise manner to each other. At least part of the lateral surface of the second body may be formed to be inclined along the direction of being away from the first body. The lateral surface of the first body may be formed to be inclined in the opposite direction to the lateral surface of the second body.

As another example associated with the present disclosure, a protrusion may be protruded at a lateral surface of the second body to be caught in the direction of being away from the first body.

As still another example associated with the present disclosure, a window may be mounted on a front surface of the first body, and at least part of the first region is formed in parallel to the window. The second region may be covered by the second body, and the first region may be exposed to the outside. A surface covered by the second region of the second body may be open, and a frame at least part of which is disposed at an opening portion of the second body to support the first body may be mounted on the second body. The frame may be screw-engaged with a rear surface of the first body in the second region.

As yet still another example associated with the present disclosure, a first case forming the appearance of the first body and a second case forming the appearance of the second body may be made of different materials to each other. The first case may be made of a metal material, and a window may be mounted on the first case, and a protective member with a softer material than that of the first case may be disposed between the first case and the window to protect the window.

As still yet another example associated with the present disclosure, a connection line electrically connected between the circuit board and the display unit may pass through the second region, and electronic elements associated with the function of the display unit may be mounted on the first body, and electronic elements for implementing a phone call function may be mounted on the second body.

As yet still another example associated with the present disclosure, an audio output unit may be mounted on the second body. The audio output unit may include a bone conduction receiver, and the bone conduction receiver may be disposed to transfer vibration to a rear surface of the first body. An antenna module for transmitting a radio signal may be mounted on the second body, and the bone conduction receiver may be mounted on the antenna module, and at least part of which may be brought into surface contact with a rear surface of the first body.

As still yet another example associated with the present disclosure, the first body may be formed with an inlet hole into which audio output from the audio output unit flows, and an audio output path extended from the inlet hole to guide the audio.

As yet still another example associated with the present disclosure, the first and the second body may be combined with each other in a detachable manner. Hooks corresponding to each other may be formed on a rear surface of the first body and a front surface of the second body, respectively, and the hooks may be engaged or disengaged as the first and the second body are slid in a relative manner.

A first and a second connection terminals brought into contact with each other when the first and the second body are engaged with each other may be disposed on a rear surface of the first body and a front surface of the second body, respectively, to electrically connect the first and the second body to each other. Either one of the first and the second connection terminal may be formed to press against the other one by elasticity.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Hereinafter, a mobile terminal associated with the present invention will be described in more detail with reference to the accompanying drawings. The suffixes "module" and "unit or portion" for components used in the following description merely provided only for facilitation of preparing this specification, and thus they are not granted a specific meaning or function.

This specification employs like/similar reference numerals for like/similar components irrespective of different embodiments, so they all will be understood by the first description. The expression in the singular form in this specification will cover the expression in the plural form unless otherwise indicated obviously from the context.

A mobile terminal illustrated herein may include a laptop computer, a tablet PC, a smart phone, a digital broadcasting terminal, a personal digital assistants (PDA), a portable multimedia players (PMP), a navigator, and the like.

Figure 1:
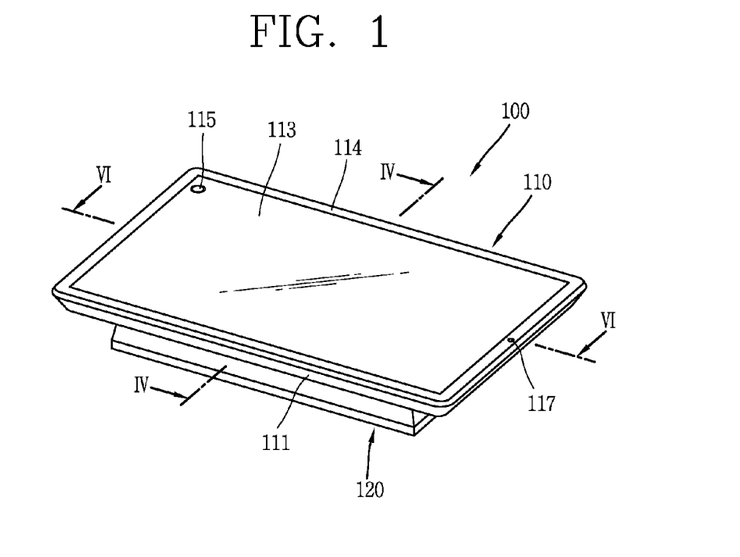
FIG. 1 is a perspective view of a mobile terminal associated with an embodiment of the present invention.
Figure 2A:
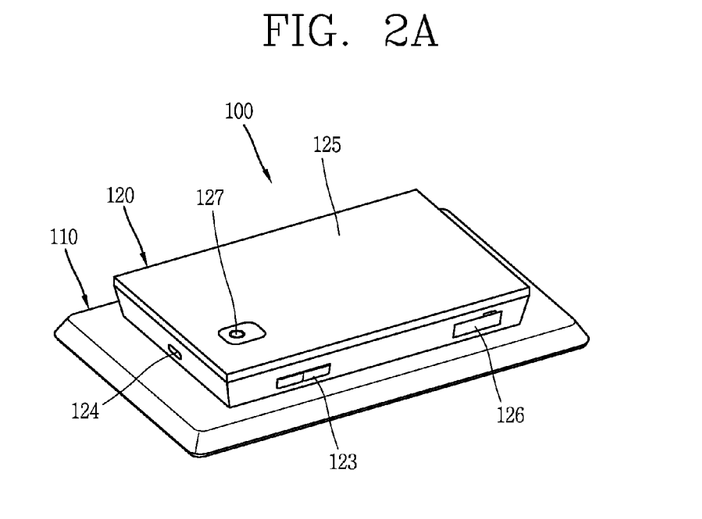
FIG. 2A is a rear perspective view of the mobile terminal illustrated in FIG. 1.
Figure 2B:
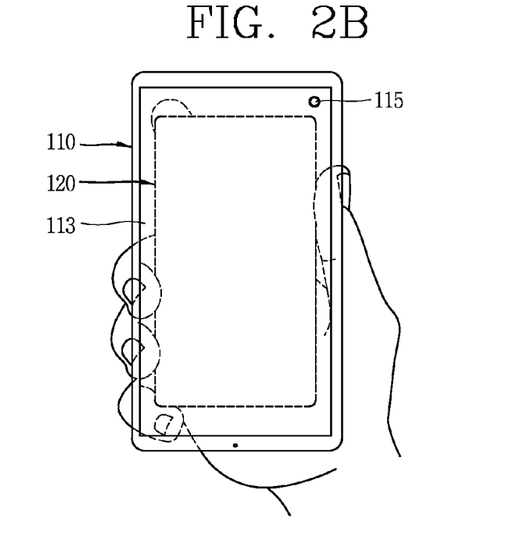
FIG. 2B is a plan view of the mobile terminal illustrated in FIG. 1.

FIG. 1 is a perspective view of a mobile terminal 100 associated with an embodiment of the present invention, and FIG. 2A is a rear perspective view of the mobile terminal 100 illustrated in FIG. 1, and FIG. 2B is a plan view of the mobile terminal illustrated in FIG. 1. The present drawings illustrate a smart phone as an example of the mobile terminal.

The mobile terminal 100 disclosed herein has a plurality of bodies 110, 120 combined with each other in a fixed manner. However, the present disclosure is not limited to this, and may be also applicable to various structures such as a mobile terminal in which two or more bodies are combined with one another in a relatively movable manner.

As illustrated in FIG. 1, the first body 110 and the second body 120 are disposed in an overlapped manner to each other. For the functions or components that can be disposed at the first body 110 and second body 120, respectively, various examples will be derived based on which function is emphasized by the mobile terminal 100 or which user interface is employed by the user.

For example, the first body 110 may primarily perform a function associated with displaying the screen of the mobile terminal, and the second body 120 may perform the other functions. As illustrated in the drawing, a display unit 113 may be mounted on a front surface of the first body 110, and a user input unit 123 (refer to FIG. 2A) for performing an input or control command may be provided at a lateral surface of the second body 120. It is to achieve a slimness on the first body 110, and elements that do not greatly affect the slimness, for example, front camera, light sensor, proximity sensor, microphone, and the like may be mounted on the first body 110.

Referring to FIG. 1, a case (casing, housing, cover, etc.) forming the appearance of the first body 110 is formed by a front case and a rear case. Various electronic components may be incorporated in a space formed between the front case and the rear case. At least one intermediate case may be additionally disposed between the front case and the rear case.

The cases may be formed by injection-molding a synthetic resin or may be also formed of a metallic material such as stainless steel (STS), titanium (Ti), or the like.

A display unit 113 and a camera 115 may be disposed at the first body 110.

The display unit 113 occupies the most portion of a main surface (front surface) of the first body 110. The display unit 113 is a device for displaying visual information or image information, and the display unit 113 may include at least one of a Liquid Crystal Display (LCD), a Thin Film Transistor-LCD (TFT-LCD), an Organic Light Emitting Diode (OLED) display, a flexible display, a three-dimensional (3D) display. The display unit 113 may include a touch pad for allowing an input of the information caused by the user's touch. In this case, the to display unit 113 may be operated as a touch screen.

In case of a touch screen, the icons of function keys may be output in a touch input enable state as virtual keys on an exposed portion of the touch screen. When a moving image is displayed on the display unit 113, the function keys may be configured to receive a command for implementing the functions such as pause, play, backward, forward, play list, and the like.

Various kinds of visual information may be displayed on the display unit 151. The visual information may be displayed in the form of characters, numerals, symbols, graphics, or icons.

For an input of the visual information, at least one of the characters, numerals, symbols, graphics, or icons may be displayed with a predetermined arrangement so as to be implemented in the form of a keypad. Such a keypad may be referred to as a so-called "soft key."

The display unit 113 may be operated on an entire region or operated by dividing into a plurality of regions. In case of the latter, the plurality of regions may be configured to be operated in an associative way. According to the drawing, a bezel portion 114 for supporting the display unit 113 may be provided at an edge thereof.

A camera 115 may be disposed on a region adjacent to one of both ends of the display unit 113. The camera 115 may be provided at the terminal body in a rotatable and popupable manner.

Referring to the drawing, a microphone 117 may be provided at the terminal body. The microphone 117 may be disposed in a region adjacent to the other end thereof.

Referring to FIG. 2A together with FIG. 1, a user input unit 123 and an interface 126 may be disposed at a lateral surface of the second body 120.

The user input unit 123 is manipulated to receive a command for controlling the operation of the mobile terminal 100, and may include a plurality of manipulation units. The manipulation units may be commonly designated as a manipulating portion, and any method may be employed if it is a tactile manner allowing the user to perform manipulation with a tactile feeling.

The manipulation units may be implemented by including a keypad, a dome switch, a touch pad (pressure/capacitance), a jog wheel, a jog switch, and the like.

The contents inputted by the plurality of manipulation units may be set in various ways. For example, the first manipulation unit may be used to receive a command such as start, end, or the like, and the second manipulation unit may be used to receive a command such as scroll or a command for controlling an audio volume level.

The interface unit 126 may be a connection port, and may receive data or power from an external device and deliver it to each component in the mobile terminal 100, or transmit data from the mobile terminal 100 to an external device. For example, the interface 126 may be at least one of a wired or wireless connection port for connecting to an earphone, a port for short distance communication (for example, Infrared Data Association (IrDA) port, Bluetooth port, wireless LAN port, etc.), and power supply terminals for supplying power to the mobile terminal.

The interface 126 may be a card socket for accommodating an external type card such as Subscriber Identity Module (SIM), User Identity Module (UIM), a memory card for information storage, and the like.

According to the drawing, a power supply unit 125 and a second camera 127 may be mounted on the second body 120.

The power supply unit 125 may be mounted on the second body to supply power to the mobile terminal 100. The power supply unit 125 may be incorporated into the body as an internal battery.

The second camera 127 may be additionally mounted on the rear case 122 of the second body 120. The second camera 127 has a direction substantially opposite to that of the foregoing camera 115 (refer to FIG. 1), and may have different pixels from those of the camera 115.

A flash and a mirror unit may additionally be disposed adjacent to the second camera 127. When capturing an object using the second camera 127, the flash illuminates light toward the object. When the user captures himself or herself (in a self-portrait mode) using the second image input unit, the mirror unit may allow the user to look at his or her own face or the like in a reflected manner.

Furthermore, an audio output module 124 may be disposed on the second body 120, and another audio output module may be additionally disposed on a rear surface of the terminal body. Both the audio output modules can implement a stereo function, and the additional audio output module may be also used to implement a speaker phone mode during a phone call.

Furthermore, an antenna for receiving wireless communication or broadcast signals may be disposed on a lateral surface of the terminal body. The antenna may be provided to be retractable from the terminal body.

Referring to FIGS. 1 and 2B, the second body 120 is hidden by a front surface of the first body 110, and thus only the display unit 113 is shown in a prominent manner on a front surface of the mobile terminal. Furthermore, when looking at the display unit 113 in a state that the user holds the second body 120, the display unit 113 is not hidden by the user's hand. Accordingly, it may be possible to achieve a large-sized screen. Furthermore, even when the first body 110 is configured in a large size, the weight may be lighter than the large-sized screen due to a small size of the second body 120.

Hereinafter, the structure of a mobile terminal allowing such a new design or form factor will be described in more detail.

Figure 3:
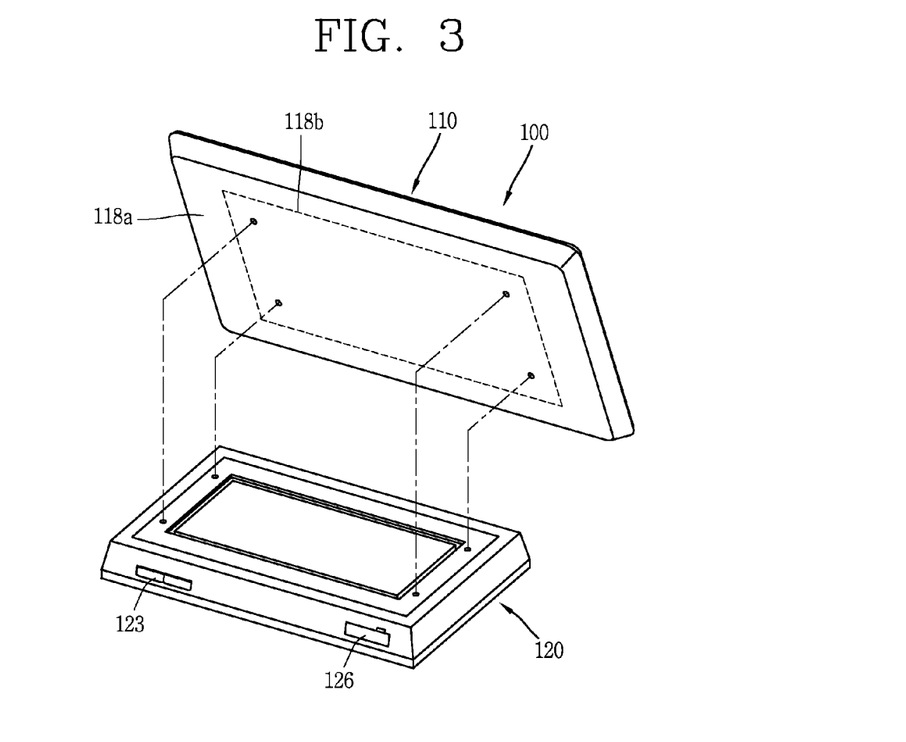
FIG. 3 is an exploded view illustrating an mobile terminal in FIG. 1.
Figure 4:
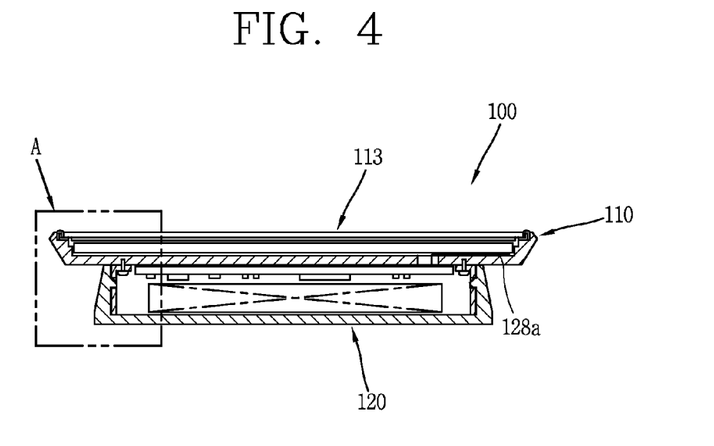
FIG. 4 is a cross-sectional view of a mobile terminal taken along the line IV-IV in FIG. 1.
Figure 5:
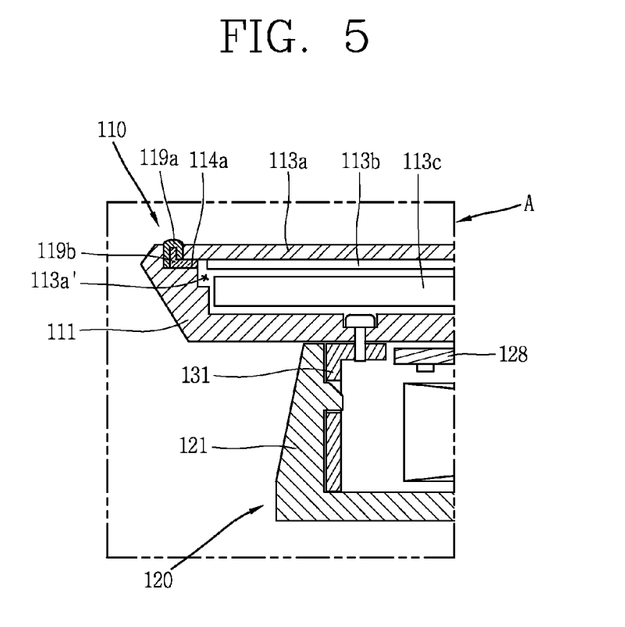
FIG. 5 is an enlarged view of portion A in FIG. 4.
Figure 6:
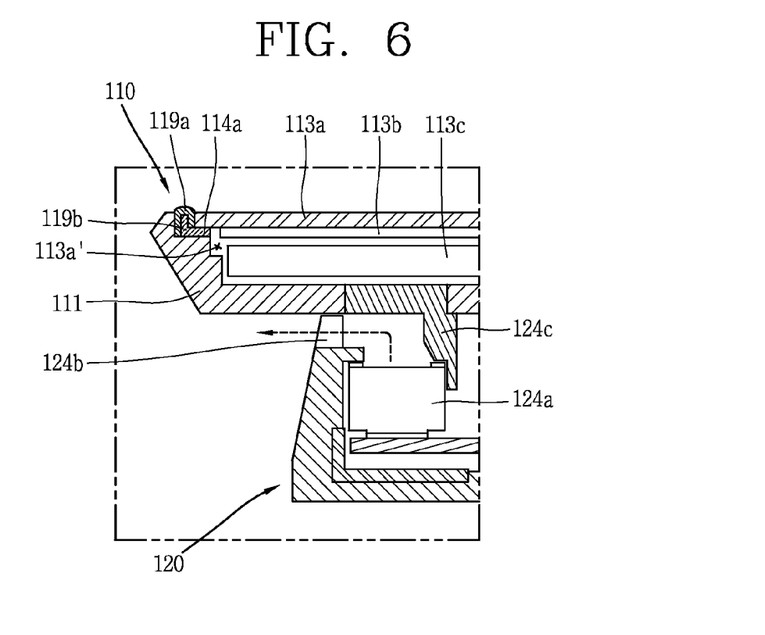
FIG. 6 is a partial cross-sectional view of a mobile terminal taken along the line VI-VI in FIG. 1.

FIG. 3 is an exploded view illustrating an mobile terminal in FIG. 1, and FIG. 4 is a cross-sectional view of a mobile terminal taken along the line IV-IV in FIG. 1, and FIG. 5 is an enlarged view of portion A in FIG. 4, and FIG. 6 is a partial cross-sectional view of a mobile terminal taken along the line VI-VI in FIG. 1.

Referring to FIG. 3, the second body 120 is mounted on a rear surface of the first body 110. Furthermore, the rear surface of the first body 110 is partitioned into a first and a second region 118a, 118b.

The first region 118a is formed along an edge of the first body 110. For example, the first region 118a is formed in a closed loop shape, and the second region 118b is disposed at a central portion of the closed loop. In other words, a region defined (or surrounded) by the first region 118a becomes the second region 118b.

Referring to FIG. 3 together with FIG. 2B, the second body 120 is disposed at the second region 118b to be hidden by a front surface of the first body 110. In other words, the second region 118b is covered by the second body 120, and the first region 118a is exposed to the outside.

Referring to FIGS. 4 and 5, a circuit board 128 for driving the display unit 113 is incorporated into the second body 120. The circuit board 128 may be configured as an example of the controller for operating various functions of the mobile terminal.

The first body 110 is formed with a thinner thickness and broader area than the second body 120 to implement the appearance of a slim and large-sized screen. Since the second body 120 is hidden by a front surface of the first body 110, particularly the user recognizes it as a thin and large-sized screen when looking at the front surface of the first body 110.

In order to implement such a design, and electronic elements associated with the function of the display unit 113 may be mounted on the first body 110, and electronic elements for implementing a phone call function may be mounted on the second body 120.

More specifically, a window 113a is mounted on a front surface of the case 111 (hereinafter, referred to as a "first case"). The window 113a may be configured with a light transmittable material, for example, light transparent synthetic resin, reinforced glass, and the like. However, the window 113a may include a non-transparent portion.

A window hole 113a' corresponding to the window 113a is formed at the first case 111, and the window 113a is placed at a mounting portion 114a formed along an inner wall of the window hole 113a'. The mounting portion 114a is provided as an element of the bezel portion 114 (refer to FIG. 1).

A display element 113c may be mounted on a rear surface of the window 113a. The display element 113c displays visual information, and disposed to be covered by the window 113a. The display element 113c may be any one of a Liquid Crystal Display (LCD), a Thin Film Transistor-LCD (TFT-LCD), an Organic Light Emitting Diode (OLED) display, a flexible display, or a three-dimensional (3D) display.

The window 113a is disposed to cover the display element 113c, and a transparent portion of the window 113a may have an area corresponding to the display element 113c. Through this, the user can recognize visual information displayed on the display element 113c from the outside.

According to the drawing, a touch sensor 113b may be mounted on the window 113a.

The touch sensor 113b may be mounted on a rear surface of the window 113a, and a transparent portion of the window 113a may form a region in which an input is enabled through the touch sensor 113b. The touch sensor 113b is made of a light transparent material, and a change such as voltage, capacitance, or the like generated at a specific portion of the window 113a is converted into an electrical input signal to sense a touch input.

In this manner, the window 113a, touch sensor 113b, and display element 113c may be configured as the display unit 113 (refer to FIG. 1), and in this case the display unit 113 is operated as a touch screen.

The circuit board 128 mounted on the second body 120 drives the display unit 113. A connection line 128a electrically connected between the circuit board 128 and the display unit 113 is formed to pass through the second region 118b. The connection line 128a may be a flexible circuit or coaxial cable for connecting the display element 113c to the circuit board 128. However, the present disclosure is not limited to this, the connection line 128a may be implemented by a combination of connection terminals. Furthermore, a battery mounted on the second body 120 may supply power to the display element 113c of the first body 110 through the connection line 128a.

Referring to the drawings, at least part of the first region 118a is formed in parallel to the window 113a. As the second body 120 is formed in a smaller size than that of the first body 110, a lateral surface of the second body 120 and a lateral surface of the first body 110 have a step to each other. According to the structure, when the user holds a lateral surface of the second body 120, the user is not obstructed by a rear surface of the first body 110. Furthermore, the user can look at the screen in a state of holding a lateral surface of the second body 120, and thus it may be possible to mount the mobile terminal without hiding the display unit 113.

Furthermore, according to the drawing, at least part of the lateral surface of the second body 120 is formed to be inclined along the direction of being away from the first body 110. Through the inclination, a lateral surface of the first body 110 and a lateral surface of the second body 120 form an acute angle to each other. Due to the structure, the user can more easily hold the second body 120.

The area of the second body 120 is gradually broader in the direction of being away from the first body 110, but a rear surface of the second body 120 is formed with a smaller size than that of the first body 110.

Referring to FIG. 3, the user input unit 123, the interface 126, and the like may be disposed at a lateral surface of the second body 120. In case of a smart phone, a portable phone or tablet PC in the related art, when looking at the display unit, the user input unit and interface are exposed to the user, but according to the present disclosure, the second body 120 is completely hidden, and thus they are not exposed to the outside.

Furthermore, according to a mobile terminal in the present disclosure, a lateral surface of the first body 110 may be formed to be inclined in an opposite to direction to the lateral surface of the second body 120. In this case, the user input unit and the like may be disposed at an inclined portion of the lateral surface of the first body 110 so as to be hidden by a front surface of the first body 110.

In this manner, when looking at a front surface (or display unit) of the first body, the structure in which the user input unit or interface is not exposed (the structure in which the bezel portion forms an outer angle of the first body) may be implemented by any one of the foregoing methods.

Referring to FIG. 6, an audio output unit 124 is mounted on the second body 120. The audio output unit 124 may be implemented in the form of a receiver or speaker. An outlet hole 124b for audio output is provided at a lateral surface of the second body. Through this, an outlet hole for audio output is not disposed at a front surface of the first body 110.

Through this, it may be possible to have a new type of design in which the outlet hole is not disposed on the display unit 113 or bezel portion 114 of the first body (refer to FIGS. 1 and 2B). However, the present disclosure is not limited to this, and the outlet hole may be provided at the first body 110 or disposed at the other surface of the second body 120.

According to the drawing, an audio outlet surface of the audio output unit 124 may be disposed toward a front surface of the second body 120, and a guide member 124c formed to guide audio to the outlet hole 124b located at a lateral surface of the second body 120 may be provided to cover the audio outlet surface. The guide member 124c may be mounted on the second region 118b of the first body 110 to form a shape of being protruded toward the audio outlet surface. However, the present disclosure is not limited to this, and the guide member 124c may be also mounted on the second body 120.

Referring to FIG. 5, a first case 111 forming the appearance of the first body 110 and a second case 121 forming the appearance of the second body 120 are made of different materials to each other. For example, the first case 111 is made of a metal material, and the second case 121 is formed of a synthetic resin material.

Since the metal material is higher in strength and rigidity, the first case 111 may be formed with a thickness less than that of the second case 121.

According to the drawing, a protective member 119a with a softer (or more ductile) material than that of the first case 111 is disposed between the first case 111 and the window 113a to protect the window 113a mounted on the first case 111. The protective member 119a may be formed of a rubber or synthetic resin material, and a metal plate 119b for supporting this may be mounted on the first case 111. However, the protective member 119a may be fixed by a fixing method without using the metal plate 119b (for example, fitting or adhesion to the case).

Referring to FIGS. 3 and 5, a surface covered by the second region 118b of the second body 120 may be open. More specifically, a front surface of the second case 121 is open and a rear surface thereof is formed in a closed shape, and the front surface of the second case 121 faces a rear surface of the first body.

A frame 131 at least part of which is disposed at an opening portion of the second body 120 to support the first body 110 is mounted on the second body 120. The frame 131 may be formed of a metal material, and may be hook-combined with the second case 121 or integrated into the second case 121 using insert molding or the like. Furthermore, the frame 131 is screw-engaged with a rear surface of the first body 110 in the second region. Through this, the first and the second body 110, 120 are fixed and combined with each other in a fixed manner.

According to the structure, it may be possible to implement a complicated to inner structure having the appearance of a metal body for mounting various electronic components with a synthetic resin material.

Figure 7A:
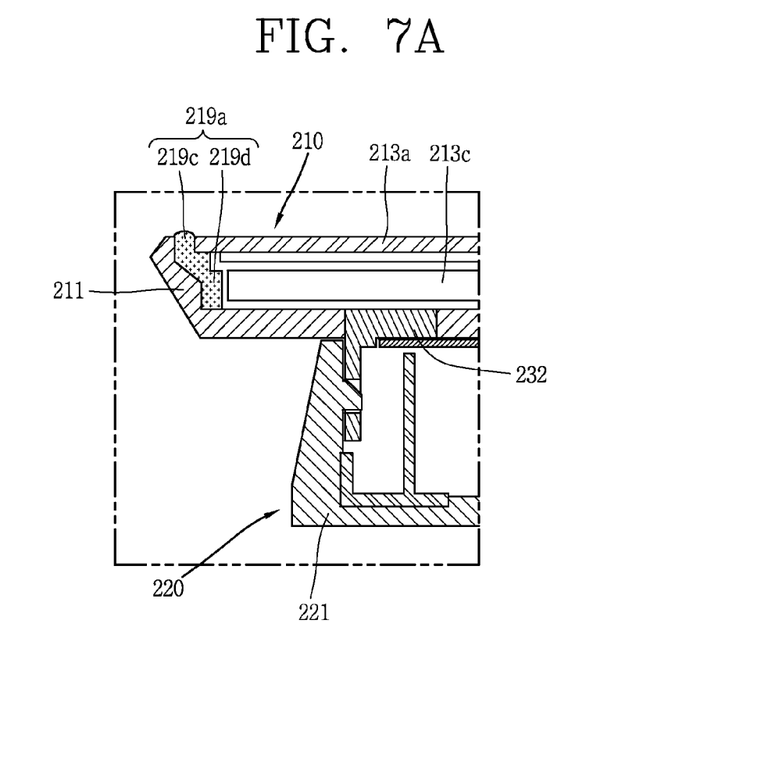
FIGS. 7A and 7B are cross-sectional views illustrating modified examples of a first body in FIG. 5.
Figure 7B:
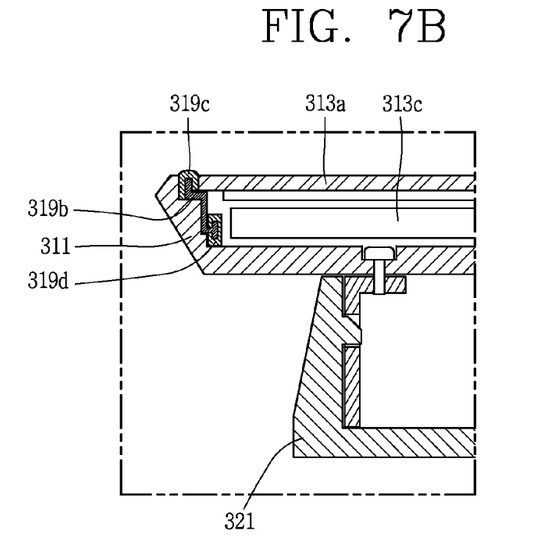

Combination relations between a mechanism for protecting the foregoing window and bodies may be modified in various ways. FIGS. 7A and 7B are cross-sectional views illustrating modified examples of a first body in FIG. 5.

Referring to FIG. 7A, a protective member 219a may be disposed between the window 213a and the case 211 as well as formed between the case 211 and the display unit 213c. For example, the protective member 219a may be a shape of being extended from the first portion 219c of the window 213a side to the second portion 219d of the display unit 213c side. Moreover, the protective member 219a may be formed to correspond to the shape of an inner surface of the case 211.

Furthermore, the first body 210 and second body 220 are fixed to each other by hook combination. According to the drawing, a stationary unit 232 mounted on the first body 210 is protruded to the outside of the first body 210, and hook-combined with the second body 220. According to the structure, fastening between the bodies 210 220 can be further facilitated.

Referring to FIG. 7B, a first portion 319c and a second portion 319d of the protective member 319a may be formed as separate members from each other without being provided as an integral body. More specifically, a metal plate 319b is formed to be extended along an inner surface of the case 311 from the window 313a to the display unit 313c, and the first portion 319c and second portion 319d are combined with the metal plate 319b, respectively. For example, the first portion 319c and second portion 319d are inserted into both ends of the metal plate 319b, respectively, and to this end, insertion holes may be provided at the first portion 319c and second portion 319d.

On the other hand, describing the audio output unit mounted on the second body again, in a mobile terminal according to the present disclosure, the audio output unit may be mounted on the second body, but may be implemented to output audio to the first body. Hereinafter, a mechanism performing such a function will be described in more detail.

Figure 8A:
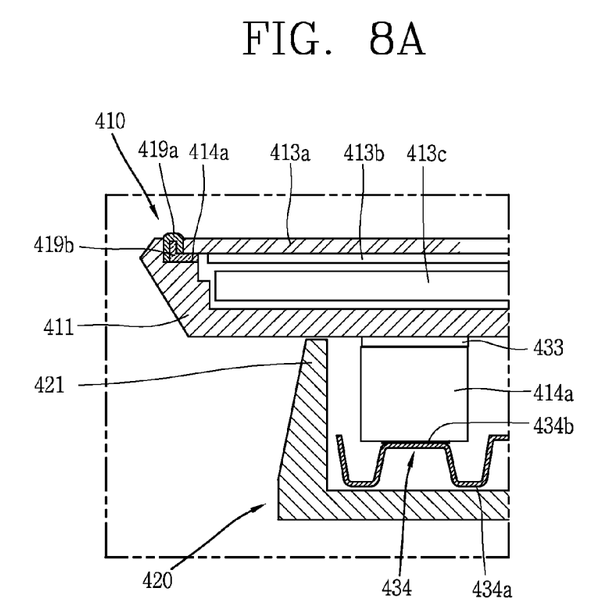
FIGS. 8A and 8B are cross-sectional views illustrating a mobile terminal associated with another embodiments of the present invention.
Figure 8B:
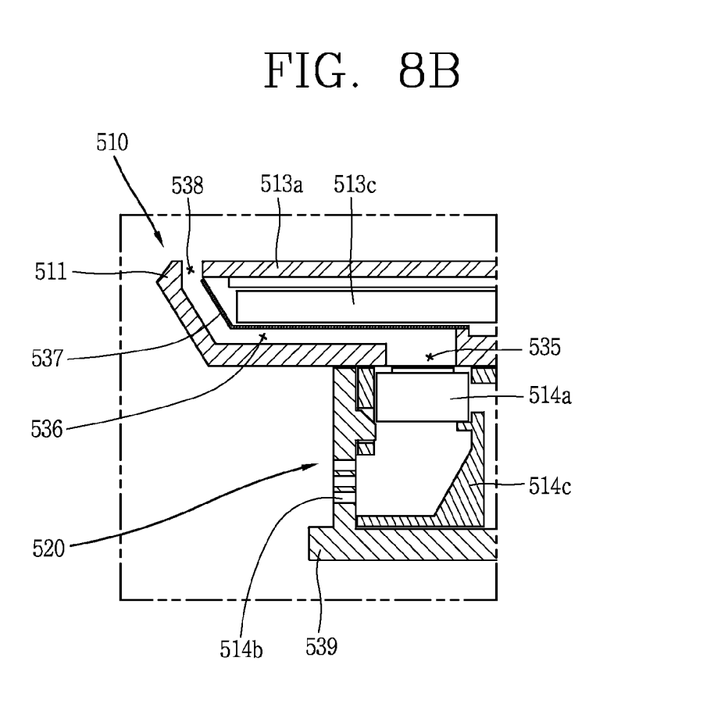

FIGS. 8A and 8B are cross-sectional views illustrating a mobile terminal associated with another embodiments of the present invention.

Referring to FIG. 8A, an audio output unit mounted on the second body 420 may include a bone conduction receiver 414a. Bone conduction refers to a phenomenon in which sound waves are conducted through the bones of the scull and directly transferred to the inner ear, and the bone conduction receiver 414a denotes a receiver with the scheme of transferring sound vibrations to the user's auditory nervous system using the principle.

According to the drawing, the bone conduction receiver 414a is disposed to transfer vibrations to a rear surface of the first body. For example, the bone conduction receiver 414a is implemented to be brought into surface contact with a rear surface (more specifically, second region) of the first body 410 through an adhesive member or pad 433. Vibrations output from the bone conduction receiver 414a through the surface contact can be more effectively transferred to the first case 411.

Furthermore, an antenna module 434 for transmitting radio signals may be mounted on the second body 420, and the bone conduction receiver 414a may be mounted on the antenna module 434. The antenna module 434 is formed in such a shape that a radiator (not shown) is mounted on a carrier 434a, and the bone conduction receiver 414a is adhered to a surface of the carrier 434a.

More specifically, a protrusion surface 434b is formed on one surface of the carrier 434a, and the bone conduction receiver 414a is mounted on the protrusion surface 434b to be closer to the first body 410. Furthermore, the radiator is mounted on the other surface (a surface opposite to the one surface) and disposed to face a rear surface of the second body 420.

According to the structure, it may be possible to implement a mechanism in which phone sound is output through the first body 410 without having an outlet hole for outputting audio on a front surface of the first body 410.

Referring to FIG. 8B, the first body 410 is formed with an inlet hole 535 into which audio output from the audio output unit flows, and an audio output path 536 extended from the inlet hole 535 to guide the audio.

The audio output path 536 may be implemented by a guide plate 537. The guide plate 537 may be formed in a plate shape, and have a shape corresponding to an inner surface of the first case 511, and disposed to be separated by specific intervals. The audio output path 536 is formed between the guide plate 537 and the first case 511 by the gap.

According to the drawing, the audio output path 536 may be a path connected from an inlet hole 535 provided at a rear surface (more specifically, second region) of the first body 510 to an outlet hole 538 provided at a front surface of the first body 510. The outlet hole 538 may be a gap that is formed between the window 513a and the first case 511. According to the structure, the audio of the audio output unit mounted on the second body 520 may be output to a front surface of the first body 510.

Referring to FIG. 8B, the audio output unit may be a two-way speaker 514a. However, the present disclosure is not limited to this, and the audio output unit may be a one-way speaker or receiver, and may be also implemented with a structure without having a guide member 514c.

The two-way speaker 514a is implemented to output audio in different directions to each other, respectively. Through this, it may be a receiver in one direction, and may be a speaker in the other direction. For example, audio being output toward the inlet hole 535 is guided to a front surface of the first body 510 and audio being output in an opposite direction thereto is guided by the guide member 514c and flowed into a lateral surface of the second body 520. For the lateral surface audio output, the guide member 524b is mounted on the second body 520 to convert the flow direction of audio, and the outlet hole 514b may be formed at a lateral surface of the second body 520.

Furthermore, referring to FIG. 8B, a lateral surface of the second body 520 may be formed in a non-inclined shape. In this case, a protrusion 539 may be protruded at a lateral surface of the second body 520 to be caught in the direction of being away from the first body 510. The protrusion 539 may be formed in a loop shape along a lateral surface of the second body 520, thereby facilitating the user to hold the second body 520 even without the inclination.

Figure 9A:
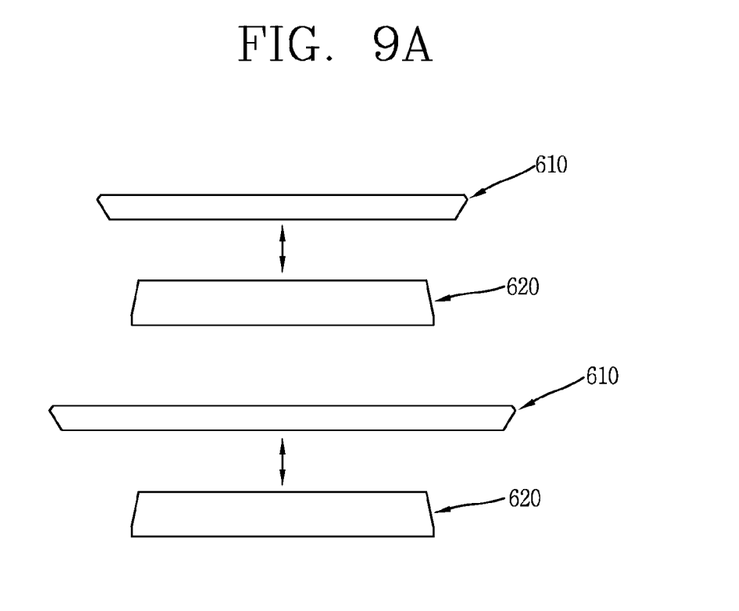
FIGS. 9A and 9B are conceptual views illustrating a mobile terminal associated with still another embodiments of the present invention.
Figure 9B:
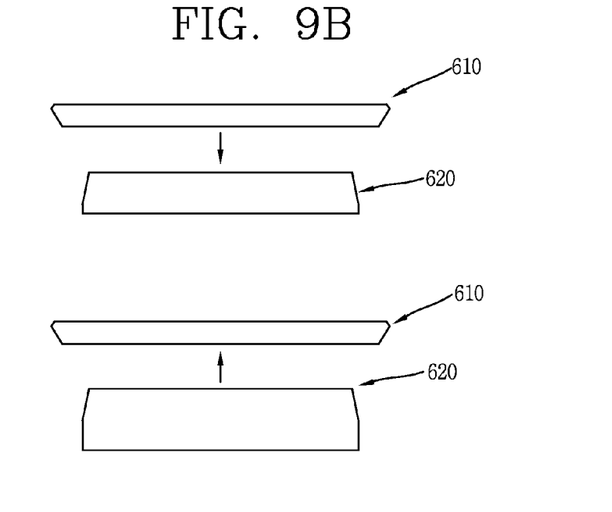
Figure 10:
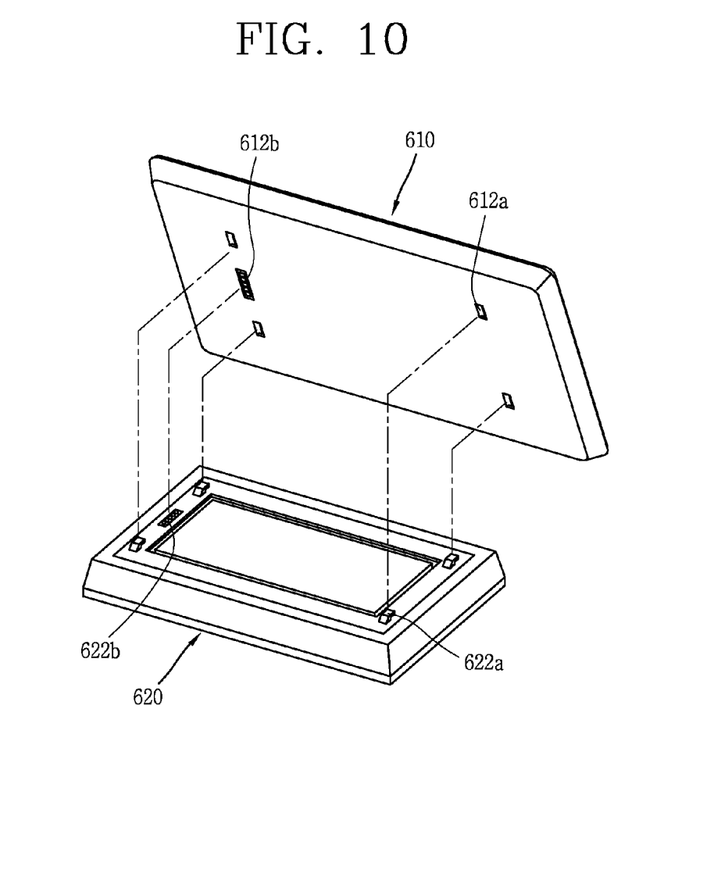
FIG. 10 is an exploded view of the mobile terminal in FIG. 9A.
Figure 11:
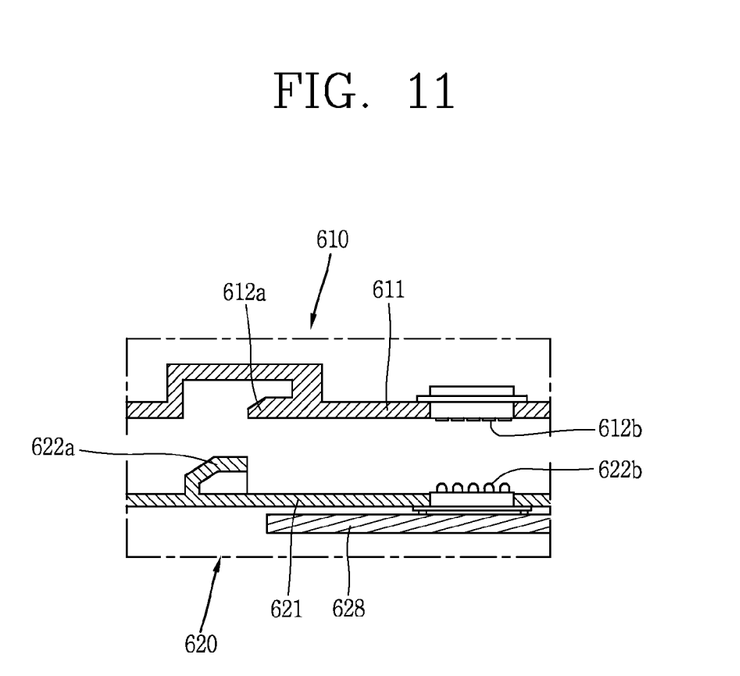
FIG. 11 is a cross-sectional view of the mobile terminal in FIG. 9A.

FIGS. 9A and 9B are conceptual views illustrating a mobile terminal associated with still another embodiments of the present invention, and FIG. 10 is an exploded view of the mobile terminal in FIG. 9A, and FIG. 11 is a cross-sectional view of the mobile terminal in FIG. 9A.

Referring to the drawings, the first and the second body 610, 620 are formed to be combined in a detachable manner. In other words, the bodies 610, 620 are engaged with each other in a separable manner, respectively, and configured in a compatible manner to efficiently change a design form according to the user's preferable specification.

Referring to FIG. 9A, the second body 620 may be a fixed part, and the first body 610 may be a variable part. On the contrary, as illustrated in FIG. 9B, the first body 610 may be a fixed part, and the second body 620 may be a variable part.

Referring to FIGS. 10 and 11, the first and the second body 610, 620 may be engaged with each other in a sliding manner. For example, hooks 612a, 622a corresponding to each other are formed on a rear surface of the first body 610 and a front surface of the second body 620, respectively, and the hooks 612a, 622a are engaged or disengaged as the first and the second body are slid in a relative manner.

A first and a second connection terminals 612b, 622b brought into contact with each other when the first and the second body 610, 620 are engaged with each other are formed on a rear surface of the first body 610 and a front surface of the second body 620, respectively, to electrically connect the first and the second body 610, 620 to each other, and the hooks 612a, 622a are disposed thereon. According to the structure, it may be possible to achieve releasement prevention in the direction perpendicular to the sliding direction.

Either one of the first and the second connection terminal 612b, 622b is formed to press against the other one by elasticity. For example, an end portion of the second connection terminal 622b is protruded from a rear surface of the second body 620 to elastically press against the first connection terminal 612b when the second body 620 is combined with the first body 610. However, the present disclosure is not limited to this, the shapes of the first and the second connection terminal 612b, 622b may be changed to each other.

More specifically, the second connection terminal 622b may be a pogo pin, and electrically connected to the circuit board 628 in a state of being mounted on the second case 621 or may be surface-mounted on the circuit board 628. The corresponding first connection terminal 612b may be a conductive pad or C-clip mounted on a flexible circuit board extended from the display unit.

According to the structure, the first and the second body may be electrically connected or disconnected in interlock with the engagement and disengagement to each other.

According to the present disclosure, a mobile terminal may be formed in a stacked structure having the first and the second body, thereby implementing stable grip feeling through the second body even though the screen of the first body is increased.

Furthermore, according to the present disclosure, electronic elements implementing a phone call function may be mounted on the second body, thereby further reducing a width of the bezel. Through this, it may be possible to implement the display unit having a further large-sized screen. In particular, the audio output unit may be mounted on the second body, thereby allowing the first body to be slimmer.

Furthermore, according to the present disclosure, the stacked first and the second body may be configured in a separable manner, thereby implementing a mechanism that can be changed according to the user's preference.

The configurations and methods according to the above-described embodiments will not be applicable in a limited way to the foregoing mobile terminal, and all or part of each embodiment may be selectively combined and to configured to make various modifications thereto.

What is claimed is:

1. A mobile terminal, comprising:
   a first body comprising a first surface and a second surface, the second surface located at an opposite side from the first surface and oriented substantially parallel to the first surface, wherein the second surface includes a first region extending a distance from a periphery of the second surface toward a center of the second surface and a second region defined and surrounded by the first region;
   a second body comprising a third surface and a fourth surface, the fourth to surface located at an opposite side from the third surface and oriented substantially parallel to the third surface, wherein the third surface of the second body faces the second region of the second surface of the first body, wherein the second body is not visible when the first surface of the first body is viewed from a position substantially perpendicular to the first surface of the first body;
   a display positioned proximate the first surface of the first body and configured to display information; and
   a controller positioned within the second body and configured to control the display.

2. The mobile terminal of claim 1, wherein the periphery of the second surface of the first body is larger than and encompasses a periphery of the second body such that a step is formed between the first body and the second body.

3. The mobile terminal of claim 2, wherein:
   the second body further comprises at least one lateral surface disposed between a periphery of the third surface of the second body and a periphery of the fourth surface of the second body; and
   at least a portion of the periphery of the fourth surface of the second body corresponding to one of the at least one lateral surface of the second body extends further from an axis of the second body than a corresponding portion of the periphery of the third surface of the second body such that at least a portion of the one of the at least one lateral surface inclines away from the second surface of the first body.

4. The mobile terminal of claim 3, wherein:
   the first body further comprises at least one lateral surface disposed between a periphery of the first surface of the first body and the periphery of the second surface of the first body, wherein each of the at least one lateral surface of the first body corresponds to a lateral surface of the at least one lateral surface of the second body; and
   at least a portion of the one of the at least one lateral surface of the first body corresponding to the inclined at least a portion of the at least one lateral surface of the second body inclines in a substantially opposite direction from the at least a portion of the one of the at least one lateral surface of the second body.

5. The mobile terminal of claim 2, wherein the second body further comprises:
   at least one lateral surface disposed between a periphery of the third surface of the second body and a periphery of the fourth surface of the second body; and
   a protrusion extending from the at least one lateral surface along the periphery of the fourth surface.

6. The mobile terminal of claim 1, wherein:
   the display comprises a window coupled to the first surface of the first body; and
   at least portion of the first region of the second surface of the first body is substantially parallel to a surface of the window.

7. The mobile terminal of claim 6, wherein:
   the second region of the second surface of the first body is covered by the third surface of the second body; and
   the first region of the second surface of the first body is exposed to an outside of the mobile terminal.

8. The mobile terminal of claim 7, wherein:
   the third surface of the second body is shaped to define an opening; and
   the second body further comprises a frame disposed at the opening in the third surface of the second body and configured to support the first body.

9. The mobile terminal of claim 8, wherein the frame of the second body is configured to be fastened to the second region of the second surface of the first body.

10. The mobile terminal of claim 1, wherein:
    the first body further comprises a first case formed of a first material and configured to form an appearance of the first body;
    the second body further comprises a second case formed of a second material and configured to form an appearance of the second body; and
    the first material is different from the second material.

11. The mobile terminal of claim 10, wherein:
    the first material is a metal;

the first case defines the first surface of the first body;

the display comprises a window disposed proximate the first surface of the first body; and the first body further comprises a protective member disposed between the window and the first case and formed of a material softer than the metal of the first case.

12. The mobile terminal of claim 1, wherein:

the first body further comprises electronic elements associated with functions of the display disposed therein;

the second body further comprises electronic elements for implementing a phone call function disposed therein; and the mobile terminal further comprises a connection line electrically coupled between the controller and the display and passing from the second body through the second region of the second surface of the first body.

13. The mobile terminal of claim 1, wherein the second body further comprises an audio output unit.

14. The mobile terminal of claim 13, wherein the audio output unit comprises a bone conduction receiver disposed and configured to transfer vibration to the second surface of the first body.

15. The mobile terminal of claim 14, wherein:

the second body further comprises an antenna module disposed therein and configured to transmit a radio signal;

the bone conduction receiver is mounted on the antenna module; and at least portion of the bone conduction receiver contacts the second surface of the first body.

16. The mobile terminal of claim 13, wherein the first body further comprises:

an audio inlet hole configured to receive audio output from the audio output unit; and an audio output path extending from the audio inlet hole and configured to guide the received audio output.

17. The mobile terminal of claim 1, wherein the first body is detachably coupled to the second body.

18. The mobile terminal of claim 17, wherein:

the second surface of the first body or the third surface of the second body includes at least one hook;

the other of the second surface of the first body or the third surface of the second body includes at least one aperture corresponding to the at least one hook; and the at least one hook and the at least one aperture are configured to engage each other in a sliding manner.

19. The mobile terminal of claim 18, wherein:

the first body further comprises a first connection terminal disposed at the second region of the second surface of the first body;

the second body further comprises a second connection terminal disposed at the third surface of the second body; and the first connection terminal and the second connection terminal are configured to contact each other when the first body and second body are coupled to each other and to electrically couple the first body and second body to each other.

20. The mobile terminal of claim 19, wherein the first connection terminal or the second connection terminal is configured to bias against the other of the first connection terminal or the second connection terminal.

* * * * *